United States Patent
Wade

(10) Patent No.: US 11,571,937 B2
(45) Date of Patent: Feb. 7, 2023

(54) APPARATUS AND METHOD FOR AN IMPROVED TRAILER HITCH

(71) Applicant: James Wade, Heflin, AL (US)

(72) Inventor: James Wade, Heflin, AL (US)

( * ) Notice: Subject to any disclaimer, the term of this patent is extended or adjusted under 35 U.S.C. 154(b) by 217 days.

(21) Appl. No.: 16/058,387

(22) Filed: Aug. 8, 2018

(65) Prior Publication Data

US 2020/0047573 A1  Feb. 13, 2020

(51) Int. Cl.
*B60D 1/28*  (2006.01)

(52) U.S. Cl.
CPC ..................... *B60D 1/28* (2013.01)

(58) Field of Classification Search
CPC . B60D 1/28; B60D 1/155; B60D 1/40; B60D 1/44
See application file for complete search history.

(56) References Cited

U.S. PATENT DOCUMENTS

| | | | | |
|---|---|---|---|---|
| 5,288,095 A * | 2/1994 | Swindall | ........ | B60D 1/40 280/479.2 |
| 5,322,315 A * | 6/1994 | Carsten | ........ | B60D 1/40 280/479.2 |
| 5,503,423 A | 4/1996 | Roberts et al. | | |
| 5,547,210 A * | 8/1996 | Dugger | ........ | B60D 1/36 280/477 |
| 5,941,550 A * | 8/1999 | Szczypski | ........ | B60D 1/52 280/479.2 |
| 6,068,281 A * | 5/2000 | Szczypski | ........ | B60D 1/155 280/479.2 |
| 6,328,326 B1 * | 12/2001 | Slatten | ........ | B60D 1/143 280/477 |
| 6,502,845 B1 * | 1/2003 | Van Vleet | ........ | B60D 1/155 280/491.1 |
| 6,957,826 B1 | 10/2005 | Mackarvich | | |
| 7,007,967 B2 * | 3/2006 | Goettker | ........ | B60D 1/155 280/479.2 |
| D599,720 S | 9/2009 | Goettker | | |
| 7,753,395 B2 | 7/2010 | Goettker | | |
| 7,850,192 B2 * | 12/2010 | Ceccarelli | ........ | B60D 1/44 280/478.1 |
| 8,474,852 B1 | 7/2013 | Granados | | |
| 8,573,628 B2 * | 11/2013 | McConnell | ........ | B60D 1/54 224/496 |
| 10,603,967 B2 * | 3/2020 | Shaffer | ........ | B60D 1/42 |
| 2008/0315561 A1 | 12/2008 | Anderson et al. | | |
| 2018/0126811 A1 | 5/2018 | Shaffer | | |

FOREIGN PATENT DOCUMENTS

WO  WO 2005095130 A1 * 10/2005
WO  WO2005095130 A1  10/2005

* cited by examiner

*Primary Examiner* — Minnah L Seoh
*Assistant Examiner* — Michael R Stabley

(57) ABSTRACT

An improved trailer hitch is presented. The tractor trailer has a main trailer frame, the main trailer for hauling cargo. To help couple a trailer cab to the trailer frame a swivel box having a spring-loaded locking pin and a permanent hinge pin is coupled to a tongue that is used to couple the trailer cab and the trailer frame. The swivel box swivels or swings the tongue to a position to accommodate a misaligned trailer cab easing the coupling process.

8 Claims, 3 Drawing Sheets

US 11,571,937 B2

APPARATUS AND METHOD FOR AN IMPROVED TRAILER HITCH

FIELD OF THE INVENTION

The present invention relates generally to trailer hitching system, and more particularly to a trailer hitching system that swivels.

BACKGROUND

Connecting the ball of a tow vehicle to the coupler of a trailer is a challenging task. The ball is typically bolted to a ball mount (e.g., a draw bar), which is mounted to a hitch (e.g., in a receiver hitch) located at the rear end of the vehicle. The coupler is mounted on the tongue of the trailer and is adapted to receive the ball of the tow vehicle. Perhaps the most difficult challenge encountered in connecting the ball to the coupler is aligning the two. Doing so typically requires a driver to back up the vehicle and a spotter outside of the vehicle to precisely guide the driver. Even with a spotter, it is not unusual for the driver to take several attempts before the ball and coupler are aligned sufficiently for the coupler to engage the ball when the trailer tongue is lowered.

There are several devices on the market that attempt to alleviate the aforementioned challenges. For example, many new vehicles come standard with backup cameras. Such cameras are typically mounted on the rear end of the vehicle to allow the driver to see the ball from inside the cab of the vehicle. Although such cameras are useful, aligning the ball with the coupler still requires just as much precision and often requires multiple attempts. Furthermore, cameras typically only provide an overhead view which does not show whether or not the ball and coupler are vertically aligned, only horizontally aligned.

DETAILED DESCRIPTION

Reference will now be made in detail to the present preferred embodiments, examples of which are illustrated in the accompanying drawings. All terms in the plural shall also be taken as singular and vice-versa. Further, any reference to he shall also be applicable to she and vice-versa.

Figure 1A:
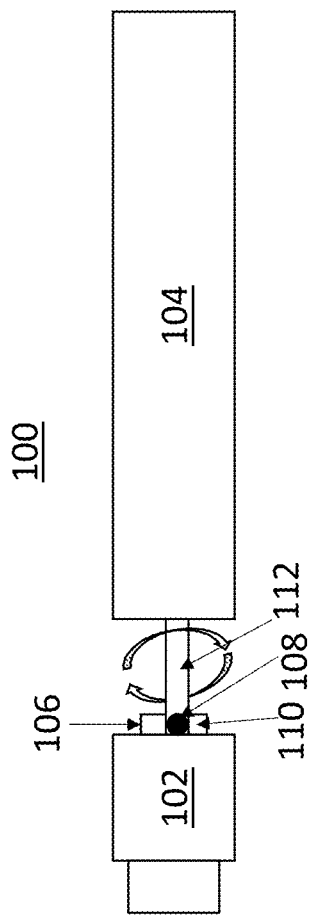
FIG. 1A is a view of a trailer cab coupled to a trailer frame.
Figure 1B:
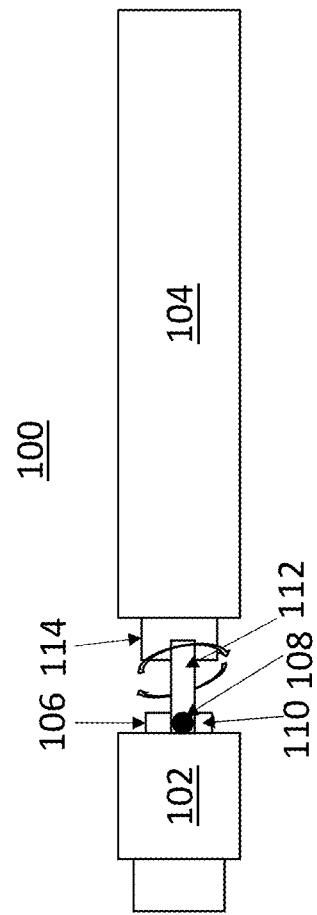
FIG. 1B is an exemplary view of a trailer cab coupled to a trailer frame utilizing an exterior swivel box.
Figure 1C:
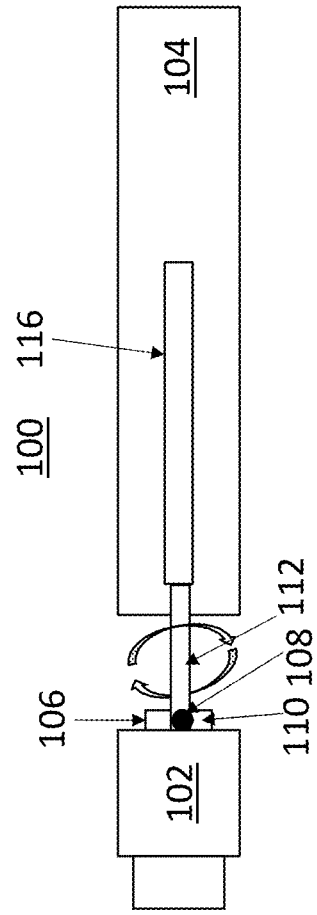
FIG. 1C is an exemplary view of a trailer cab coupled to a trailer frame utilizing a swivel box internally located.

Referring now to FIGS. 1A, 1B and 1C, a view of a trailer cab coupled to a trailer frame is presented. Before a tractor trailer 100 can be taken over the road to move products for trade, the tractor cab 102 must be coupled to a trailer frame 104. The tractor cab 102 may be any type or make of trailer cab 102 that a long or short haul driver may use in connection with a trailer frame 102. The trailer frame 102 is generally fifty-three (53) feet in length, but may vary as necessary to accommodate the load being hauled.

The trailer cab 102 has a ball assembly 106. The ball assembly 106 of the trailer cab 102 is a ball 108 coupled to a steel plate 110, which is coupled to the trailer cab 102 by a weld or other means of coupling. The ball assembly 106 is external to the trailer cab 102 such that room for connecting cables and ease of coupling to a trailer frame 104.

The trailer frame 104 has a tongue 112. The tongue 112 is used in coupling the trailer frame 104 to the trailer cab 102 securely. The tongue 112 generally is fabricated to fit over the ball 108 of the ball assembly 106 of the trailer cab 102. The size of the ball 108 to be used is dependent on the connection of the tongue 112.

The tongue, in FIG. 1A, is rigid and is not able to be turned from side to side. Thus, when a trailer cab 102 is backed up to be coupled to the trailer frame 104, the trailer cab 102 must be backed to a specific position in order for the ball assembly 106 and the tongue 112 to align properly and have a secure coupling.

FIG. 1B shows a trailer cab 102 being coupled to a trailer frame 104. The trailer cab 102 has a ball assembly 104 for securely coupling the trailer cab 102 to the trailer frame 104. The ball assembly 104 has a ball 108 securely coupled to a steel plate 110. The coupling of the ball 108 securely coupled to a steel plate 110 is generally by welding but may be coupled to the trailer cab 102 by any means that supports a secure coupling.

The trailer frame 104 of FIG. 1B has a tongue 112 which engages with the ball assembly 106 of the trailer cab 102. The tongue 112 is coupled to a swivel box 114. The swivel box 114 allows for the tongue 112 to swing or swivel at least fifteen (15) inches to accommodate a trailer cab 102 being coupled to the trailer frame 104.

By allowing the tongue 112 to be swiveled, the tongue 112 is easier to be aligned with the ball 108 of the ball assembly 106 of the trailer cab 102. Thus, when a swivel box 114 is used in connection with coupling the trailer cab 102 and the trailer frame 104, the trailer cab 102 only needs to be in a general area related to the tongue 112 of the trailer frame 104 and not a single position. The tongue 112 can then be swiveled to ease the coupling of the trailer cab 102 to the trailer frame 104.

The trailer frame 104 of FIG. 1C has a swivel box 114 that is internally coupled 116 to the trailer frame 104. By internally placing the swivel box 114 in or under the trailer frame 104, the tongue 112 does not protrude further forward and the swivel box 114 may be more protected from elements or contaminants it may come into contact with being exposed as shown in FIG. 1B. The operation of the swivel box 114 and the coupling of the trailer cab 102 and the trailer frame 104 are similar to FIG. 1B.

Figure 2A:
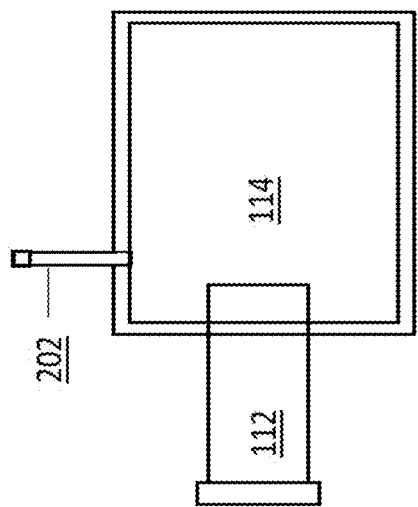
FIG. 2A is an exemplary swivel box with a locking pin in a first position.
Figure 2B:
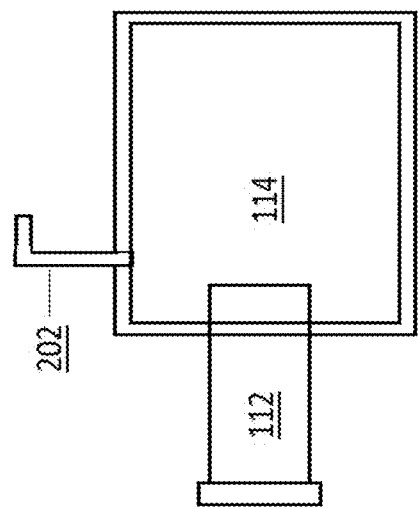
FIG. 2B is an exemplary swivel box with a locking pin in a second position

In FIGS. 2A and 2B, a swivel box 114 is shown with a locking pin 202. Referring to FIG. 2A, the swivel box 114 is being used to couple a trailer cab 102 to a trailer frame 104. The trailer cab 102 has been backed into a position to be engaged with the trailer frame 104 but the ball 108 of the ball assembly 106 of the trailer cab 102 is not aligned properly.

Instead of the driver of the trailer cab 102 trying to reposition the trailer cab 102 to the proper position, the swivel box is employed to accommodate the positioning of the ball 108 of the ball assembly of the trailer cab 102 by swiveling or swinging.

The swivel box 114 has a locking pin 202. The locking pin 202 is positioned in the swivel box 114 to allow the tongue 112 to be swung in either direction so that it can more easily align a misaligned ball 108 of the ball assembly 106 of the trailer cab 102.

The locking pin 202 is pulled out, although not completely, from the swivel box 114. The locking pin 202 is then turned to release the swivel box 114 and the tongue 112 such that the tongue can be swung or swiveled to align properly with the ball 108 of the ball assembly 106 of the trailer cab 102.

After the coupling of the ball 108 of the ball assembly 106 of the trailer cab has been completed, the locking pin 202 can be repositioned to lock the tongue 112 to not be movable and provide a secure coupling. To accomplish the locking of the tongue 112, the locking pin 202 is pulled out, though not completely, then turned to the locking position and pushed back into the swivel box 114.

Figure 3:
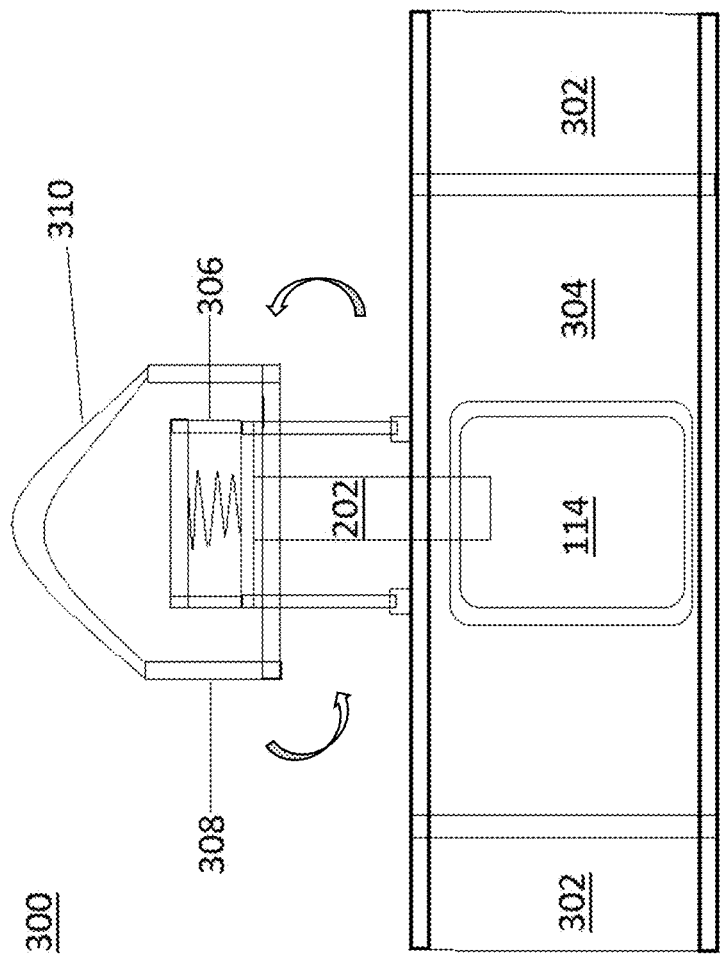
FIG. 3 is an exemplary front elevation of the improved trailer hitch.

FIG. 3A shows a front elevation of the coupling device 300 used by a trailer frame 104. The coupling device 300 has side plates 302. The side plates are coupled to the top plate 304 by welds or fabrication.

The top plate 304 has a swivel box 114 to allow the tongue 112 to be swiveled or swung to a position to more easily accommodate a misaligned ball 108 of the ball assembly 106 of the trailer cab 102. The swivel box 114 has a locking pin 202 to release the swivel aspects of the swivel box 114 or to lock the swivel box 114 such that the tongue is in a singular position.

The locking pin 202 is coupled to a spring assembly 306 which allows the locking pin 202 to stay in position and is easier to set the locking pin 202 into the swivel box 114.

The spring assembly 306 has a handle assembly 308. The handle assembly 308 has a handle 310 which is secured to the spring assembly 306. To ease operation, the handle 310 can be pulled by a user to put the locking pin 202 into a locked or release position.

The handle 310 is pulled and the locking pin 202 is pulled from the swivel box 114. The handle 310 is then turned to a locking or releasing position, thus moving the locking pin 202 to the desired position. The handle 310 is released and the spring assemble 306 contracts to push the locking pin 202 into the swivel box 114 to the desired setting.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A trailer tongue, the trailer tongue comprising consisting of:
   a main trailer, where the main trailer has a main trailer frame, the main trailer for hauling cargo;
   a swivel box having a spring-loaded locking pin and a tongue; and
   a connecting arm of the trailer tongue coupled to the main trailer frame, wherein the locking pin of the swivel box being configured to maintain a current position of the swivel box, wherein coupling of the connecting arm of the trailer tongue and the main trailer frame is a coupling ball; and
   a pull handle, the pull handle being coupled to the swivel box.

2. The trailer tongue of claim 1, wherein the connecting arm is lockable in a straight forward position and may articulate about the tongue_when the locking pin is pulled upward.

3. The trailer tongue of claim 1, wherein the swivel box has one or more coiled rolled steel pins.

4. The trailer tongue of claim 1, wherein the locking pin engages with the swivel box and wherein when the locking pin is engaged with the swivel box, the swivel box does not swing.

5. The trailer tongue of claim 1, wherein when the swivel box is unlocked and the pull handle is pulled and twisted in a first direction, the swivel box is locked from swinging.

6. The trailer tongue of claim 5, wherein the pull handle is pulled two (2) inches before twisting in the first direction.

7. The trailer tongue of claim 1, wherein when the swivel box is locked and the pull handle is pulled and twisted in a second direction, the swivel box is locked from swinging.

8. The trailer tongue of claim 7, wherein the pull handle is pulled two (2) inches before twisting in the second direction.

* * * * *